United States Patent [19] [11] Patent Number: 5,021,193
Armes et al. [45] Date of Patent: Jun. 4, 1991

[54] NONAQUEOUS POLYPYRROLE COLLOIDS

[75] Inventors: Steven P. Armes, Los Alamos; Mahmoud Aldissi, Santa Fe, both of N. Mex.

[73] Assignee: United States Department of Energy, Washington, D.C.

[21] Appl. No.: 373,533

[22] Filed: Jun. 30, 1989

[51] Int. Cl.$^5$ .............................................. H01B 1/06
[52] U.S. Cl. .................................. 252/500; 252/518; 252/519; 526/258; 526/259
[58] Field of Search ...................... 252/500, 518, 519; 526/258, 259

[56] References Cited

U.S. PATENT DOCUMENTS

| | | | |
|---|---|---|---|
| 4,521,450 | 6/1985 | Bjorklund et al. | 427/121 |
| 4,724,053 | 2/1988 | Jasne et al. | 204/59 R |
| 4,818,646 | 4/1989 | Takakubo et al. | 252/58 |
| 4,835,076 | 5/1989 | Heinz et al. | 252/500 |
| 4,880,508 | 11/1989 | Aldissi | 252/500 |

OTHER PUBLICATIONS

S. P. Armes et al., "Aqueous Dispersions of Electrically Conducting Monodisperse Polypyrrole Particles," Dept. of Phys. Chem., University of Bristol, Bristol BS8 1TS, United Kingdom, J. of Colloid and Interface Science 118, 0021-9797 (1987).
S. P. Armes et al., "Dispersions of Electrically Conducting Polypyrrole Particles in Aqueous Media," J. Chem. Soc. Chem. Commun., (1987), pp. 288-290.
S. Yassar et al., "Aqueous Suspension of Conducting Material from Polypyrrole-Coated Submicronic Latex Particles," Laboratoire de Photochimie Solaire, C.N.R.S. ER 241, 1-8 rue Henry Dunant 94320, Thiais, France (1987).
R. B. Bjorklund et al., "Electrically Conducting Composites of Colloidal Polypyrrole and Methylcellulose," J. Chem. Soc., Chem. Commun., pp. 1293-1295 (1986).
Steven P. Armes et al., "Colloidal Polypyrrole", application Ser. No. 305,816 filed Feb. 3, 1989.

*Primary Examiner*—Josephine Barr
*Attorney, Agent, or Firm*—Bruce H. Cottrell; Paul D. Gaetjens; William R. Moser

[57] ABSTRACT

Processable conductive polymers including an oxidized, polymerized aromatic heterocyclic monomer, e.g., pyrrole, a stabilizing effective amount of a poly(vinyl acetate) and dopant anions, and a process of preparing said processable conductive polymers directly in a nonaqueous medium such as methyl acetate, methyl formate, ethyl formate, and propyl formate are disclosed.

10 Claims, No Drawings

NONAQUEOUS POLYPYRROLE COLLOIDS

FIELD OF THE INVENTION

The present invention relates to the field of conductive polymers, more particularly to the field of processable conductive polymers. This invention is the result of a contract with the Department of Energy (Contract No. W-7405-ENG-36).

BACKGROUND OF THE INVENTION

Conductive polymers have been widely investigated due to growing interest in their use in, e.g., anti-static coatings, conductive paints, electromagnetic shielding, electrode coatings and the like. Polypyrrole is a relatively air-stable conductive polymer which has previously been prepared by electrochemical methods (see, e.g., Kanazawa et al., J. Chem. Soc. Chem. Comm., 854 (1979)), and by chemical synthesis methods (see, e.g., Myers, J. Elec. Mat. 2, 61 (1986)). Polypyrrole latex particles have also been prepared in aqueous media by including certain polymers as polymeric surfactants often referred to as steric stabilizers, e.g., poly(vinyl alcohol-co-vinyl acetate), poly(vinylpyrrolidone), poly(acrylamide), poly(ethylene oxide) and methylcellulose. Recently, polypyrrole particles which have been prepared in an aqueous medium have then been transferred into a nonaqueous medium, e.g., dioxan (see Cawdery et al., J. Chem. Soc. Chem. Comm., 1189 (1988)).

A method of directly preparing such polypyrrole latex particles in a nonaqueous medium has previously been unavailable. Such a method would simplify the preparation by, e.g., a reduction in the number of steps and a reduction in waste by-products.

Accordingly, it is an object of the present invention to provide a process of preparing colloidal polypyrrole particles directly in a nonaqueous medium.

A further object of the present invention is to provide an electrically conductive polymer composition capable of being formed in nonaqueous medium.

Still another object of the present invention is to provide an electrically conductive polymer composition capable of ready processability.

SUMMARY OF THE INVENTION

In accordance with the objects and purposes of the present invention, there is provided a processable electrically conductive polymer composition including: an oxidized, polymerized aromatic heterocyclic monomer; poly(vinyl acetate); and dopant anions. In one embodiment of the invention, the processable electrically conductive polymer composition includes: oxidized, polymerized pyrrole; poly(vinyl acetate); and dopant anions.

The present invention further provides a process of preparing a processable electrically conductive polymer directly in a nonaqueous medium by oxidatively polymerizing a polymerizable aromatic heterocyclic monomer with a suitable oxidant in a nonaqueous medium including a poly(vinyl acetate).

DETAILED DESCRIPTION

The present invention concerns processable electrically conductive polymer compositions and processes of preparing such compositions in a nonaqueous oxidative polymerization reaction medium. By "nonaqueous" is meant that the reaction medium is essentially water-free. Such a reaction can be performed on a variety of oxidatively polymerizable monomers. Suitable oxidatively polymerizable monomers include aromatic heterocyclic compounds, such as pyrrole, N-substituted pyrroles and beta-substituted pyrroles. The substituent groups may include alkyl, aryl, aralkyl, alkaryl, hydroxy, methoxy, chloro, bromo, and nitro groups. The substituent groups can be selected consistent with the desired polymerization conditions and the desired properties of the resultant polymer composition. Pyrrole is particularly preferred as the aromatic heterocyclic monomer.

The processable electrically conductive polymer compositions include a stabilizing effective amount of a poly(vinyl acetate). While not wishing to be bound any particular theory, it is believed that the poly(vinyl acetate) functions as a steric stabilizer for the polypyrrole that is formed in the oxidative polymerization process, thereby preventing precipitation and resulting in a colloidal polypyrrole composition.

The concentration of the poly(vinyl acetate) in the nonaqueous polymerization reaction medium may vary with the choice of aromatic heterocyclic monomer, but should be a stabilizing effective amount. Generally, from about 1.0 g to about 2.0 g of the poly(vinyl acetate) per 100 ml of reaction medium will suffice as the stabilizing o effective amount and prevent precipitation of, e.g., the conductive polypyrrole, to yield the conductive composition.

The oxidant used in the oxidative polymerization process must be compatible with the poly(vinyl acetate) and capable of oxidatively polymerizing the aromatic heterocyclic monomer. By "compatible" is meant that the combination of the oxidant and the poly(vinyl acetate) does not result in the formation of insoluble precipitate in the nonaqueous reaction medium as the polymerization reaction is conducted. A preferred oxidant for the combination of pyrrole monomer and the like with poly(vinyl acetate) is ferric chloride. The result of oxidizing the aromatic heterocyclic monomer, e.g., pyrrole, with ferric chloride in a nonaqueous medium is that iron tetrachloride ions $(FeCl_4)^-$ remain in combination with chloride ions as dopant anions in the resultant electrically conductive polymer composition.

The ratio of oxidant to polymerizable monomer in the reaction medium can vary. Generally, the oxidant:polymerizable monomer molar ratio will be from about 2:1 to 4:1. Preferably, the oxidant:polymerizable molar ratio is from about 2:1 to about 2.5:1, more preferably about 2.33:1. At molar ratios lower than about 2:1, the yield and conductivity of the polypyrrole product is generally decreased.

The reaction medium for the oxidative polymerization reaction is a highly polar nonaqueous medium, e.g., a solvent such as methyl acetate, methyl formate, ethyl formate or propyl formate. The nonaqueous medium should also be a solvent for the oxidant used to polymerize the aromatic heterocyclic monomer.

After the oxidative polymerization reaction is completed the resultant conductive polymer particles can be separated, if desired, from the nonaqueous reaction medium, e.g., by centrifugation and decantation of the liquid. The colloidal conductive particles, e.g., colloidal polypyrrole particles, can be redispersed in any of the solvents useful in the preparation of the colloidal conductive particles such as methyl acetate, methyl formate, ethyl formate or propyl formate. The redispersion can be accomplished by, e.g., use of ultrasonics.

The weight ratio of the poly(vinyl acetate) to the aromatic heterocyclic monomer in the initial starting materials can vary from about to about 2:1. At too low ratios, the stabilization effect is too small to result in dispersed conductive colloidal particles and flocculation generally occurs.

Pressed pellets prepared from the conductive colloidal polymer particles have demonstrated solid-state conductivities as high as from about 0.2 siemens per centimeter ($Scm^{-1}$), these values obtained despite the presence of the poly(vinyl acetate) in the conductive composition. These conductivities do slowly decrease with age of the and conductivities are also reduced at higher values for the poly(vinyl acetate):aromatic heterocyclic monomer ratio. However, the loss of conductivity with age has appeared to be at a slower rate than that of analogous polypyrrole compositions prepared in aqueous systems.

In the preparation of the processable conductive polymer compositions of the present invention, the polymerizable aromatic heterocyclic monomer is added to a nonaqueous reaction medium containing a suitable oxidant, such as ferric chloride, for the aromatic heterocyclic monomer, and a stabilizing amount of a poly(vinyl acetate).

The present invention is more particularly described in the following examples which are intended as illustrative only, since numerous modifications and variations will be apparent to those skilled in the art.

EXAMPLE 1

A reaction vessel was charged with 100 ml of methyl acetate, 1.0 g of poly(vinyl acetate), and 5.47 g of ferric chloride. The poly(vinyl acetate) was characterized by a number average molecular weight of about 87,500 and a weight average molecular weight of about 266,300. The admixture was stirred at room temperature as 1.00 ml of pyrrole was added. Stirring was continued for about 15 hours. The resultant colloidal particles were separated from any excess stabilizing polymer and inorganic by-products by centrifuging at 5,000 rpm for 40 minutes, and decantation of the dark colored supernatant from the black sediment. The sediment was washed several times with small quantities of methyl acetate and then redispersed in methyl acetate and vacuum-filtered to remove all traces of precipitate. Gravity-filtering may also be used instead of vacuum-filtering. Transmission and scanning electron microscopy studies on the dried dispersion indicated a polydisperse spherical particle morphology with particle diameters of about 250± 100 nanometers. Microanalysis of the dried dispersion showed a composition indicating the presence of polypyrrole as the polymer with the additional presence of a mixture of chloride and iron tetrachloride. The conductivity of a pressed pellet of the latex powder was measured as 0.1 $Scm^{-1}$. The conductivity of this pellet was retested about 3 months later and measured 0.067 $Scm^{-1}$. A second run was conducted in the same manner as above and the resultant pressed pellet of latex powder had a conductivity of 0.25 $Scm^{-1}$.

EXAMPLES 2-7

Additional examples were conducted similarly to Example 1 with the exception that the type of solvent and/or quantity of solvent was as summarized in Table 1, the solvent was precooled to about 0° C. in Examples 4 and 5, and the reaction time ranged up to from 22 to 24 hours in Examples 3, 6 and 7 and was about 45 hours for Example 4.

TABLE 1

| example no. | solvent type | solvent volume (ml) | weight of PVAC (g) | conductivity of pellet ($Scm^{-1}$) |
|---|---|---|---|---|
| 2 | methyl acetate | 200 | 1.0 | $4.5 \times 10^{-3}$ |
| 3 | methyl acetate | 200 | 2.0 | $8.0 \times 10^{-4}$ |
| 4 | methyl formate | 200 | 1.0 | $1.4 \times 10^{-3}$ |
| 5 | methyl formate | 100 | 1.0 | $6.0 \times 10^{-2}$ |
| 6 | propyl formate | 200 | 1.0 | $3.7 \times 10^{-6}$ |
| 7 | propyl formate | 200 | 2.0 | $7.5 \times 10^{-6}$ |

It can been seen from the foregoing examples that conductive polymer compositions prepared with a poly(vinyl acetate) stabilizer achieve various conductivities depending upon the particular nonaqueous solvent used in the preparation.

Although the present invention has been described with reference to specific details, it is not intended that such details should be regarded as limitations upon the scope of the invention, except as and to the extent that they are included in the accompanying claims.

What is claimed is:

1. A processable, electrically conductive polymer composition comprising:
   an oxidized, polymerized aromatic heterocyclic monomer selected from the group consisting of pyrrole, N-substituted pyrrole, and beta-substituted pyrrole;
   a stabilizing effective amount of a polymer consisting essentially of poly(vinyl acetate), said amount effective to prevent precipitation of the conductive polymer composition during preparation by oxidative polymerization in a nonaqueous medium; and, dopant anions.

2. The composition of claim 1 wherein the aromatic heterocyclic monomer is pyrrole.

3. The composition of claim 1 wherein the dopant anions are a mixture of chloride and iron tetrachloride anions.

4. The composition of claim 1 wherein the aromatic heterocyclic monomer is pyrrole and the dopant anions are a mixture of chloride and iron tetrachloride anions.

5. The composition of claim 1 further comprising a nonaqueous dispersion medium.

6. The composition of claim 5 wherein the dispersion medium is a solvent selected from the group consisting of methyl acetate, methyl formate, ethyl formate, and propyl formate.

7. A dispersion of electrically conductive colloidal polymer particles comprising:
   a nonaqueous dispersion medium selected from the group consisting of methyl acetate, methyl formate, ethyl acetate, and propyl formate; and,
   electrically conductive colloidal polymer particles including an oxidatively, polymerized aromatic heterocyclic monomer selected from the group consisting of pyrrole, N-substituted pyrrole, and beta-substituted pyrrole, a stabilizing effective amount of a polymer consisting essentially of poly(vinyl acetate), said amount effective to prevent precipitation of the conductive polymer particles during preparation by oxidative polymerization in a nonaqueous medium, and as dopant anions a mixture of chloride and iron tetrachloride anions.

8. A process of preparing a processable, electrically conductive polymer in a nonaqueous reaction medium comprising:

oxidatively, polymerizing an aromatic heterocyclic monomer selected from the group consisting of pyrrole, N-substituted pyrrole, and beta-substituted pyrrole in a nonaqueous reaction medium selected from the group consisting of methyl acetate, methyl formate, ethyl acetate, and propyl formate, the nonaqueous reaction medium including a oxidant for the aromatic heterocyclic monomer and a stabilizing effective amount of a polymer consisting essentially of poly(vinyl acetate), said amount effective to prevent precipitation during preparation.

9. The process of claim 8 wherein the oxidant is ferric chloride.

10. The process of claim 8 wherein the nonaqueous reaction medium is a solvent selected from the group consisting of methyl acetate, methyl formate, ethyl formate, and propyl formate.

* * * * *